US012809805B2

(12) United States Patent
Hoernicke et al.

(10) Patent No.: US 12,809,805 B2
(45) Date of Patent: Nov. 24, 2026

(54) FUNCTION MODULE INTERFACE FOR AN INDUSTRIAL PROCESS ENVIRONMENT

(71) Applicant: ABB Schweiz AG, Baden (CH)

(72) Inventors: Mario Hoernicke, Landau (DE); Katharina Stark, Weinheim (DE); Nicolai Schoch, Heidelberg (DE); Sten Gruener, Laudenbach (DE); Nafise Eskandani, Rossdorf (DE)

(73) Assignee: ABB Schweiz AG, Baden (CH)

( * ) Notice: Subject to any disclaimer, the term of this patent is extended or adjusted under 35 U.S.C. 154(b) by 50 days.

(21) Appl. No.: 18/428,039

(22) Filed: Jan. 31, 2024

(65) Prior Publication Data

US 2024/0256479 A1 Aug. 1, 2024

(30) Foreign Application Priority Data

Feb. 1, 2023 (EP) .................................... 23154551

(51) Int. Cl.
*G06F 13/364* (2006.01)
*G06F 9/54* (2006.01)

(52) U.S. Cl.
CPC ............ *G06F 13/364* (2013.01); *G06F 9/541* (2013.01)

(58) Field of Classification Search
CPC ...................................................... G06Q 30/02
See application file for complete search history.

(56) References Cited

U.S. PATENT DOCUMENTS

2004/0117049 A1* 6/2004 Bieber ............... G05B 23/0213 700/100
2011/0093800 A1* 4/2011 Gottwald .................. G06F 8/38 715/763

FOREIGN PATENT DOCUMENTS

EP 3985465 A1 * 4/2022 ....... G05B 19/41845

OTHER PUBLICATIONS

Hoernicke et al., "Automation architecture and engineering for modular process plants—approach and industrial pilot application," *IFAC-PapersOnLine*, 53(2): 8353-8358 (Jul. 12-17, 2020).
European Patent Office, Extended European Search Report in European Patent Application No. 23154551.8, 8 pp. (Jun. 9, 2023).

* cited by examiner

*Primary Examiner* — Henry Tsai
*Assistant Examiner* — Juanito C Borromeo
(74) *Attorney, Agent, or Firm* — Fitch Even Tabin & Flannery LLP

(57) ABSTRACT

A connecting interface for a function module and/or function module instance in an industrial process environment for connecting an external function to the function module and/or function module instance, The function module and/or function module instance including definitions according to which the industrial process is operated, and the connecting interface containing information to create an external function module containing the external function by which the external functions can be added to the function module and/or function module instance.

12 Claims, 8 Drawing Sheets

FUNCTION MODULE INTERFACE FOR AN INDUSTRIAL PROCESS ENVIRONMENT

CROSS-REFERENCE TO RELATED APPLICATIONS

The instant application claims priority to European Patent Application No. 23154551.8, filed Feb. 1, 2023, which is incorporated herein in its entirety by reference.

FIELD OF THE DISCLOSURE

The present disclosure describes a connecting interface for a function module and/or function module instance in an industrial process environment for connecting an external function to the function module and/or function module instance.

BACKGROUND OF THE INVENTION

Today, a concept called Function Modules (FM) is used to transform traditional engineering and operation of a process plant into an object-oriented, service-based engineering and operation.

Modular plants are gradually becoming more and more established, and the community agrees to the miscellaneous benefits provided, not only with respect to development cost but also with respect to time and material efforts. As a standardized methodology, the Modular Type Packages (MTP) approach therefore creates the framework for interoperability between modules and orchestration system.

There are tools such as orchestration designers that can be used to automatically import MTP-based modules into process and electrical control systems. Furthermore, the FM concept is evolving, which can be used to develop plants in a modular fashion, but without having to stick completely to the MTP standard.

The FM concept is lacking a possibility to add advanced functionality, such as history and information management, trending, asset, and condition monitoring. Thus, an interface to let the FM know what the functionality affects inside the FM is needed to add this functionality to an FM.

BRIEF SUMMARY OF THE INVENTION

There may be a desire to improve adding functions to function modules into process control systems. The described embodiments pertain to the connecting interface, the method, the processing and control device, the industrial process network, and the use of a connecting interface. Synergetic effects may arise from different combinations of the embodiments although they might not be described in detail.

Further on, it shall be noted that all embodiments of the present invention concerning a method might be carried out with the order of the steps as described, nevertheless this has not to be the only and essential order of the steps of the method. The herein presented methods can be carried out with another order of the disclosed steps without departing from the respective method embodiment, unless explicitly mentioned to the contrary hereinafter.

Technical terms are used by their common sense. If a specific meaning is conveyed to certain terms, definitions of terms will be given in the following in the context of which the terms are used.

According to a first aspect, a connecting interface for a function module and/or function module instance in an industrial process environment for connecting an external function to a function module and/or function module instance, FM is provided. The function module and/or function module instance comprises definitions according to which the industrial process is operated. The connecting interface contains information to create an external function module containing the external function by which the external functions can be added to the function module and/or function module instance. That is, the external function module containing the interface information and the external function is used for adding the external function to the function module and/or function module instance.

In other words, the connecting interface, can be used to integrate external functions into a function module or, in more general, to a function module and/or function module instance. These external functions might be for example: history and information management, trending, advanced process control functions, asset management functions, etc.

The function module is a model with description of the topology, services, tags etc. of one or more process functions of an industrial process in an industrial process system, such as tempering as one example. That is, it usually describes a part of the process. A function module instance is instantiated from the function module, which is an actual instantiation of the function module for operating the process and contains therefore the actual values for the parameters, services, tags, etc. defined in the function module. The function module may be instantiated by one or more function module instances. The external function. The external function may be a function for a type, for an instance, or for both, depending on what the external function is. The external function may also be a function for a single device only or for a device type used within the FM or FM Instance.

The connecting interface provides a "standardized", but extensible interface of the FM. The interface can be used to identify the tags and services from the FM and the connections between the equipment. All items of the interface are uniquely identifiable. Advanced functionality, such as asset monitoring or condition monitoring for the FM in its entirety or single devices, can use this interface to expose which parts of the FM are used and the FM can use the interface, coming from the advanced functionality to know which parts of itself are affected/used by an advanced/external function.

"External" means external to the function module and/or the function module instance. The function module and the function module instance may be embedded in an orchestration designer, where the function module and the function module instance can be implemented using the information contained therein. The definition of "external" is therefore such that also functions external to the orchestration designer are excluded, so that the external function may be not created within the orchestration designer. Therefore, the connecting interface is a possible solution for connecting the functionality defined by the external function to the function module or function module instance.

To make the external function connectable with the function module and/or the function module instance and compatible with the framework such as an orchestration designer, an external function module is created. The external function module or function module instance import the connecting interface with all its information provided by the connecting interface and adds its own information to the connecting interface. The modified connecting interface is then, from view of the external function module or instance, exported again to the function module or instance so that the function module or instance and the external function module have the same interface. If a function module has already an interface including the external function information, an instantiation would also contain the external function information.

BRIEF DESCRIPTION OF THE SEVERAL VIEWS OF THE DRAWING(S)

DETAILED DESCRIPTION OF THE INVENTION

Corresponding parts are provided with the same reference symbols in all figures. Integrating functions that are not engineered in the orchestration designer (external function hereafter) to a function module and/or a function module instance is one aspect of the present disclosure. To enable this functionality, an interface is needed to describe the FM and the FM instance, which is exposed to the outside of orchestration designer. For both, the FM and the FM instance, the interface is needed. The external function can use this interface and add functionality on top. In turn, the external function adds information to the interface about which parts of the function module it uses. This information can be imported into orchestration designer to connect the function to the FM or FM instance.

Figure 1:
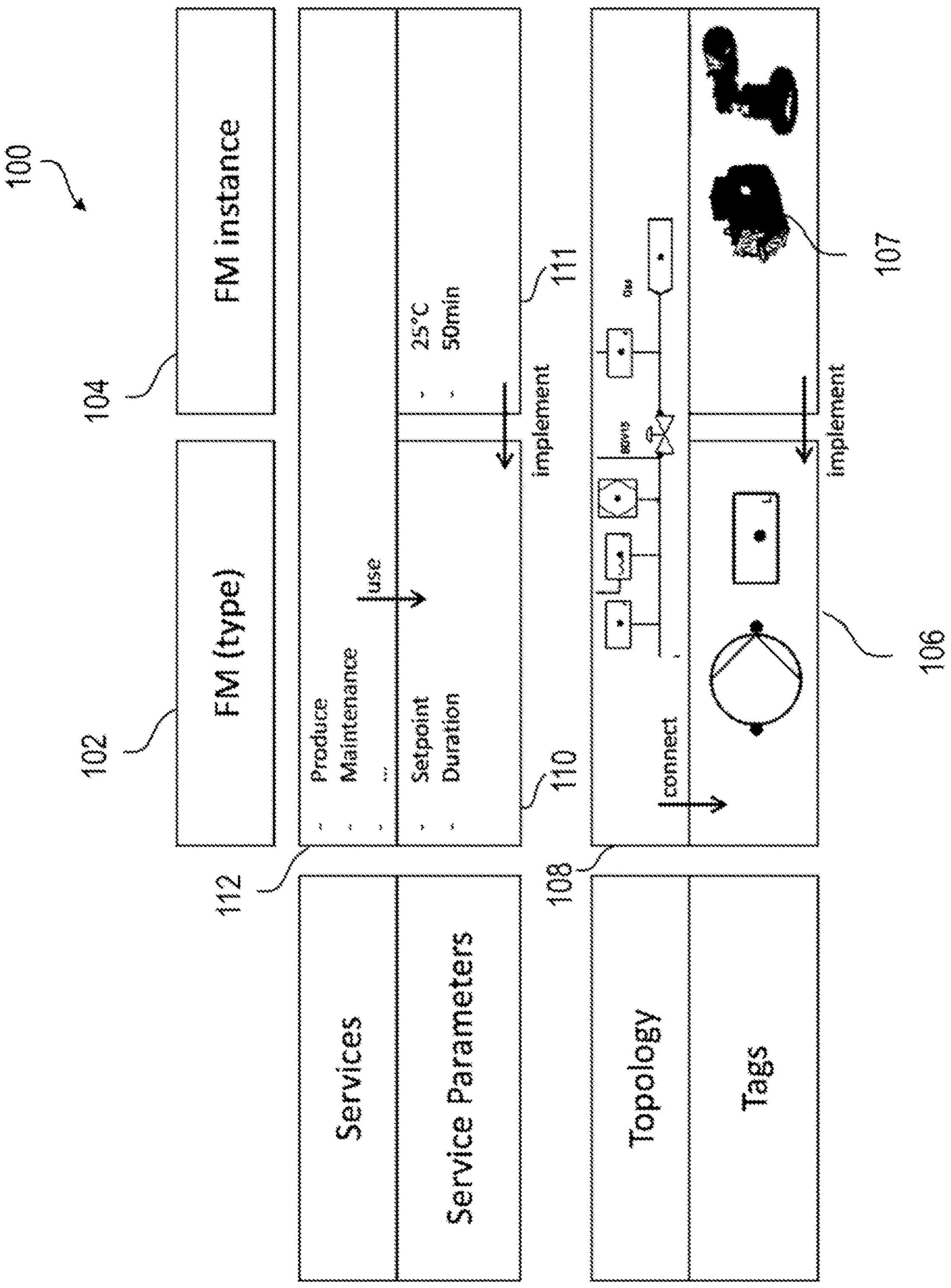
FIG. 1 is a diagram of a connecting interface in accordance with the disclosure.

Referring to FIG. 1, the connecting FM interface 100 is described. The interface 100 that can be used to connect external functions consists of two parts 102, 104 that are made available in two different engineering phases. The engineering starts with the FM engineering, where a new type 102 is defined. The type 102 defines the topology 108 of the FM 102, as well as the services 112 such as "produce" and "maintenance". Furthermore, the service parameters 111, not their value, are defined and the tags 106, not the actual devices 107, are defined. After the FM engineering, this is the first model that can be used by an external function that is related to the type 102. The information contained is the services, parameters, topology, and tags incl. their default attributes and default values.

All this information is later further specified by its actual implementation in the FM instance 104. The FM instance engineering is the second phase where the tags 106 are assigned to devices 107. The devices 107 provide their parameters and are the actual implementation of a tag 106. The service parameter values 110 are engineered for the specific FM instance 104. The FM model is afterwards enriched with the target system, device, and parameter information. This information can now be used by an external function that is related to the FM instance 104 or a specific device 107 in the FM instance. The models are summarized in FIG. 1

Figure 2:
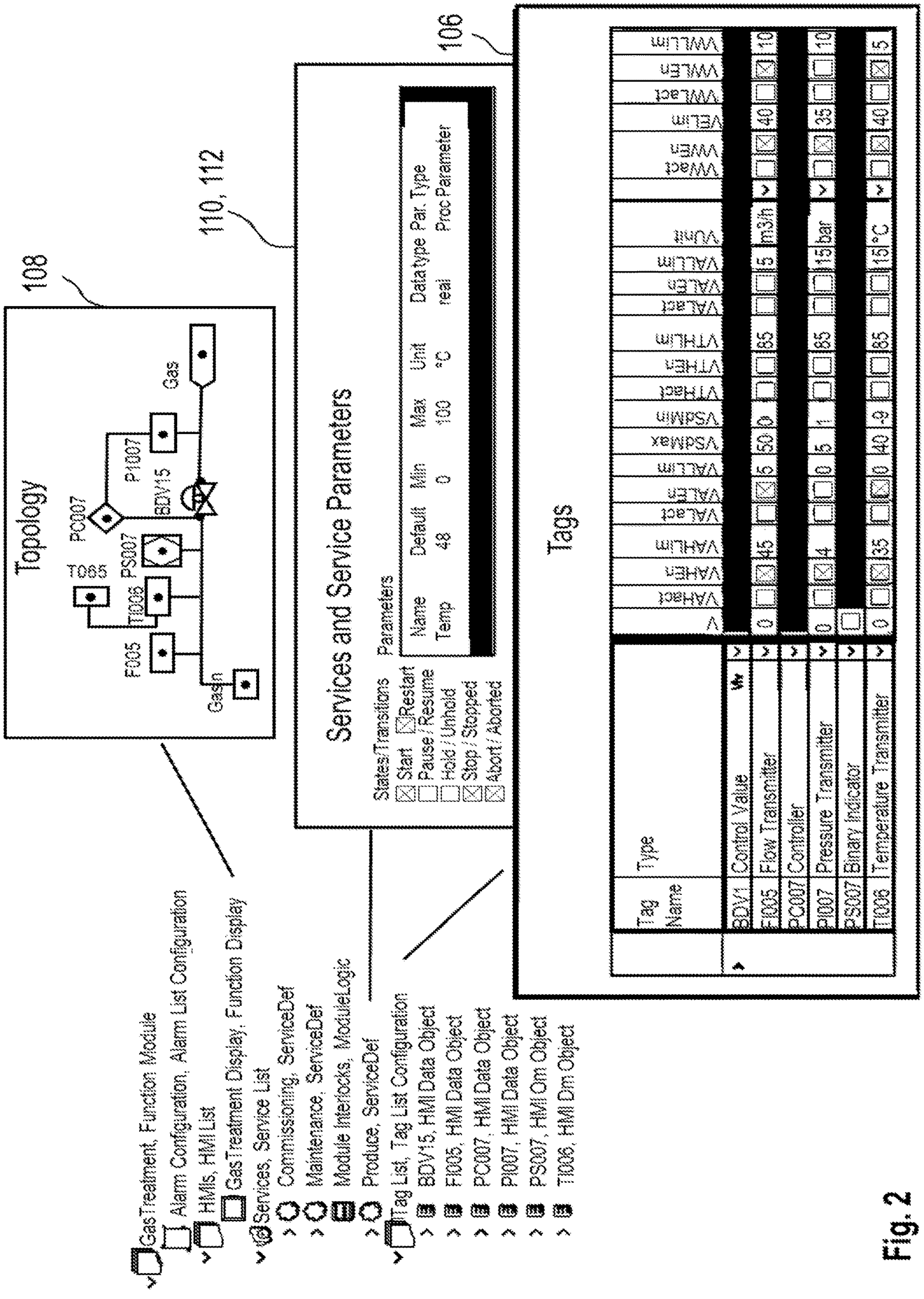
FIG. 2 is a diagram of Interfaces extracted from a function module (FM) in accordance with the disclosure.

Referring to FIG. 2, a possible Implementation FM interface 100 is described. The FM interface 100 can be implemented, for example, in an orchestration designer, where the information is already present and can simply be exported or made available through an API. A possibility would be to just reuse the generalized MTP for this and add attributes to show the FM 102 which parts of it are used by a specific external function. Another implementation could be to use the MTP sub-model from AAS and add the same information. The information gotten from an exemplary Gas Treatment FM 102 is visualized in FIG. 2. The information contains, for example, Alarm Configurations, Alarm List Configurations, HMIs and a HMI List including a Gas Treatment Display and a Function Display, Services and a Service List including "Commissioning", "Maintenance", "Module Interlocks", "Produce", Tags and a Tag List Configuration including HMI Data Objects. Examples for service parameters 110 for an exemplary service 112 "Produce" are "Start", "Restart", "Pause", "Hold", "Stop", "Stopped", "Abort", "Aborted", etc. Examples for Tags 106 are "Control Value", "Flow Transmitter", "Controller", "Pressure Transmitter", "Binary Indicator" and "Transmitter".

Figure 3:
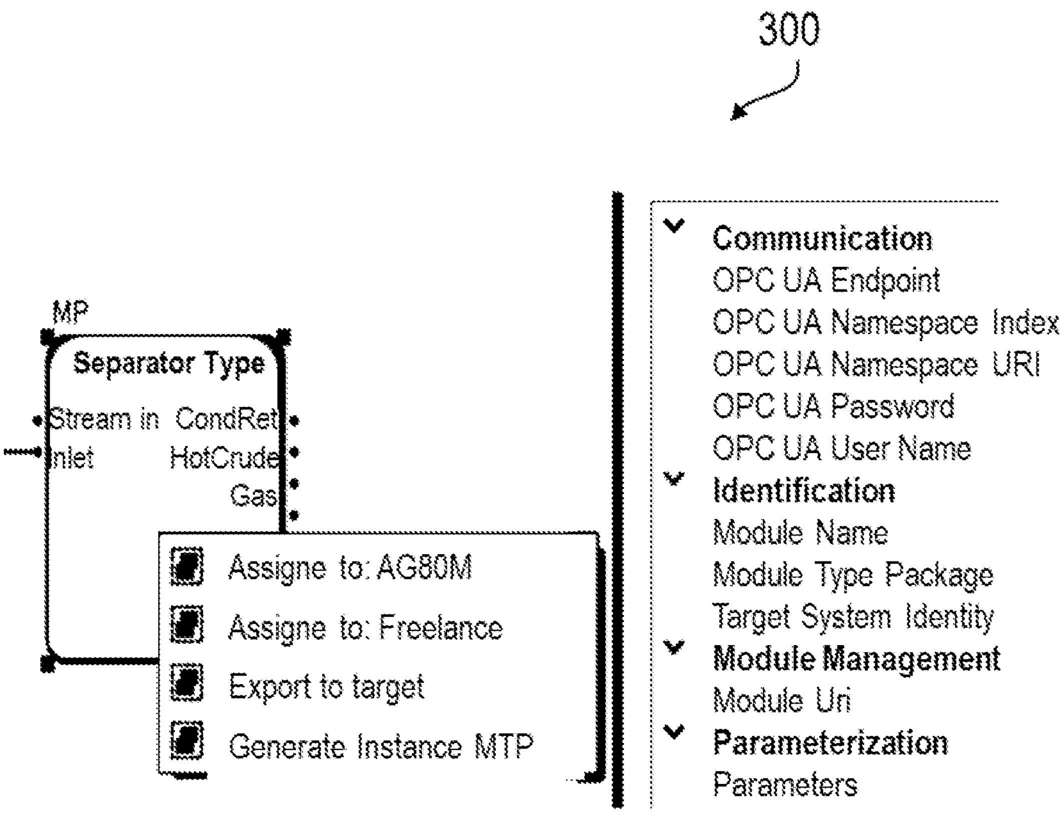
FIG. 3 is a diagram of Target system information in accordance with the disclosure.
Figure 4:
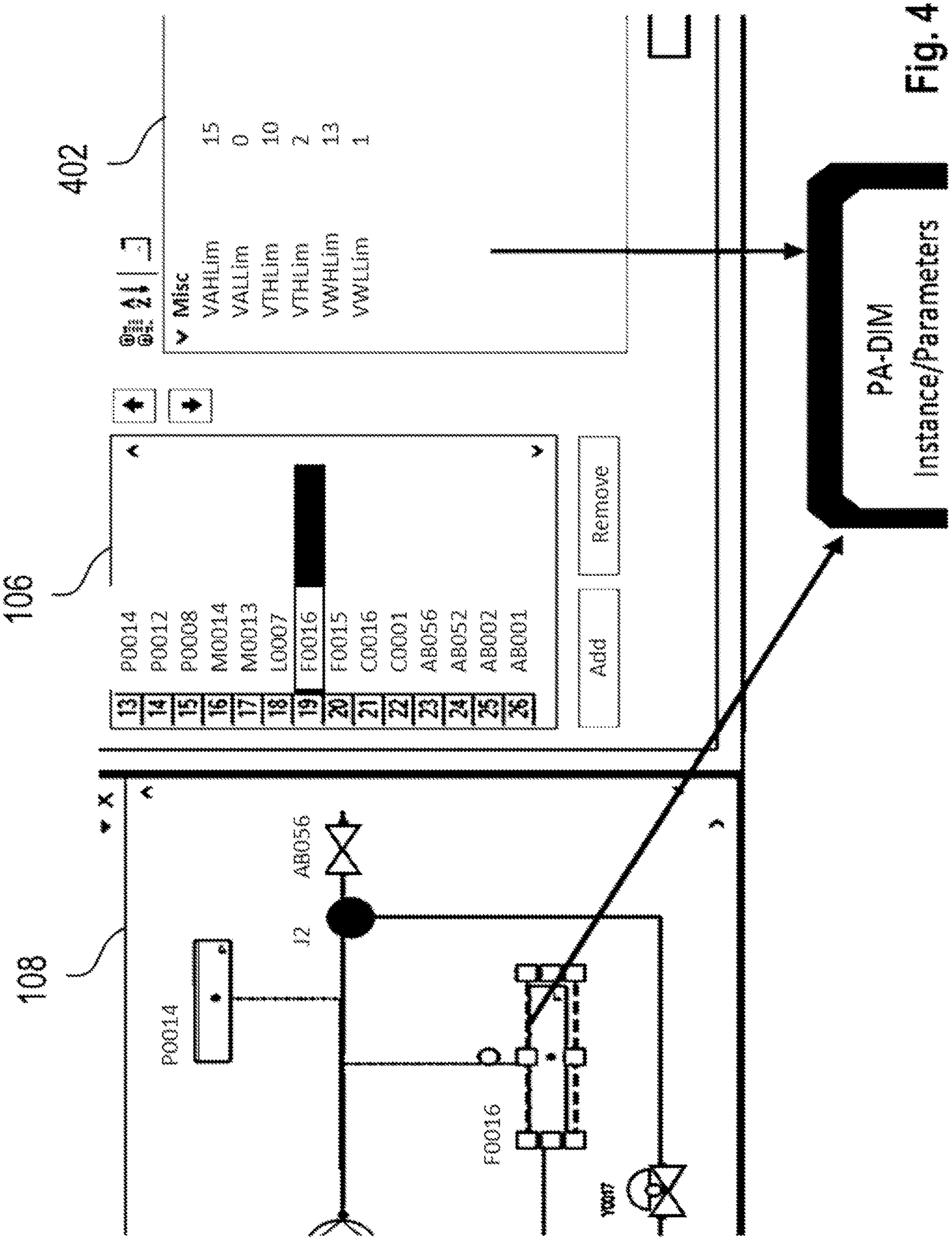
FIG. 4 is a diagram of Device parameters in accordance with the disclosure.
Figure 5:
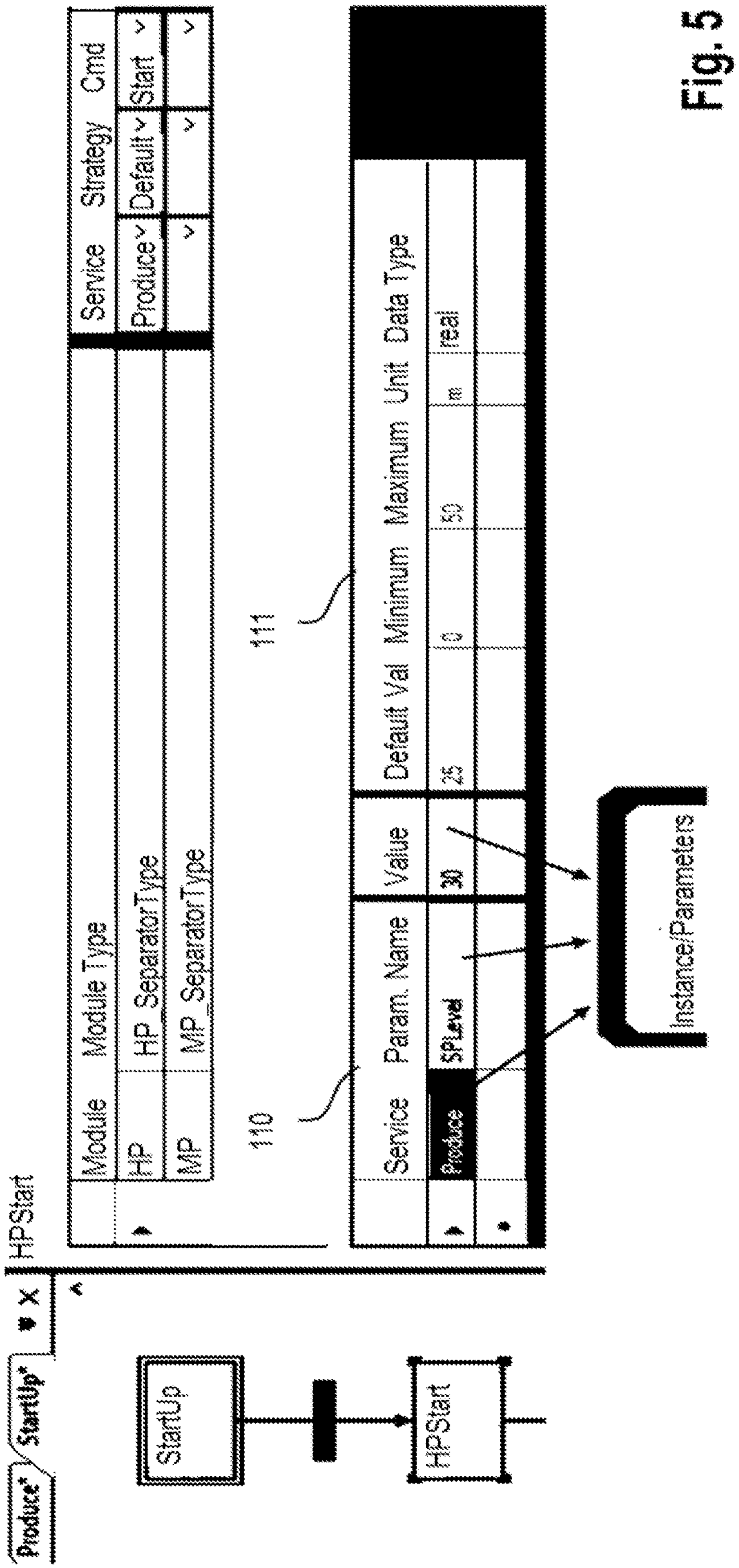
FIG. 5 is a diagram of Service parameter values in accordance with the disclosure.

Referring to FIGS. 3 to 5, a possible implementation FM instance interface is described. The model for the FM instance interface 104 can be assembled from information that is added during FM instance engineering in, e.g., the orchestration designer. The target system information is present once the controller that the FM instance should be deployed to is assigned. The endpoint, e.g., an OPC UA endpoint, as well as the controller type, for example, "AG80M", can be gotten from the stored parameters in, e.g., orchestration designer, see FIG. 3.

The second part are the device parameters 107. The parameterization 402 is stored, e.g., in the orchestration designer, as well. This can be added to the model. Thus, the limits, scaling, engineering units, etc. 402 that are specified for a tag 106, e.g. "F0016" in the FM instance 104 are now accessible, see FIG. 4. In addition, the actual device is assigned to the tag in orchestration designer. This information can be used in the interface, as well. That means, for example, device specific asset monitors can be created. In addition, device specific asset monitors can automatically be added to the tags 106 in the function module. The instance, e.g. F0016, and the parameters 402 may be defined according to PA-DIM, i.e., the OPC UA Information Model to represent and access Process Automation Devices.

The last missing information are the service parameter values 111, as assigned to the FM instance 104. Those are accessible in the recipe definition of the orchestration designer, see FIG. 5. For the different steps, different parameters might be used. Thus, a connection between the executed step and the parameter value needs to be added to the model, as well. With that, all information needed for the interface can be either exported or be made available using an API. Details of this mixed integration approach can be found in the next section. The implementation can be done by again using the AAS sub-model of MTP and enriching it with the missing information, for example the device parameters.

Figure 6:
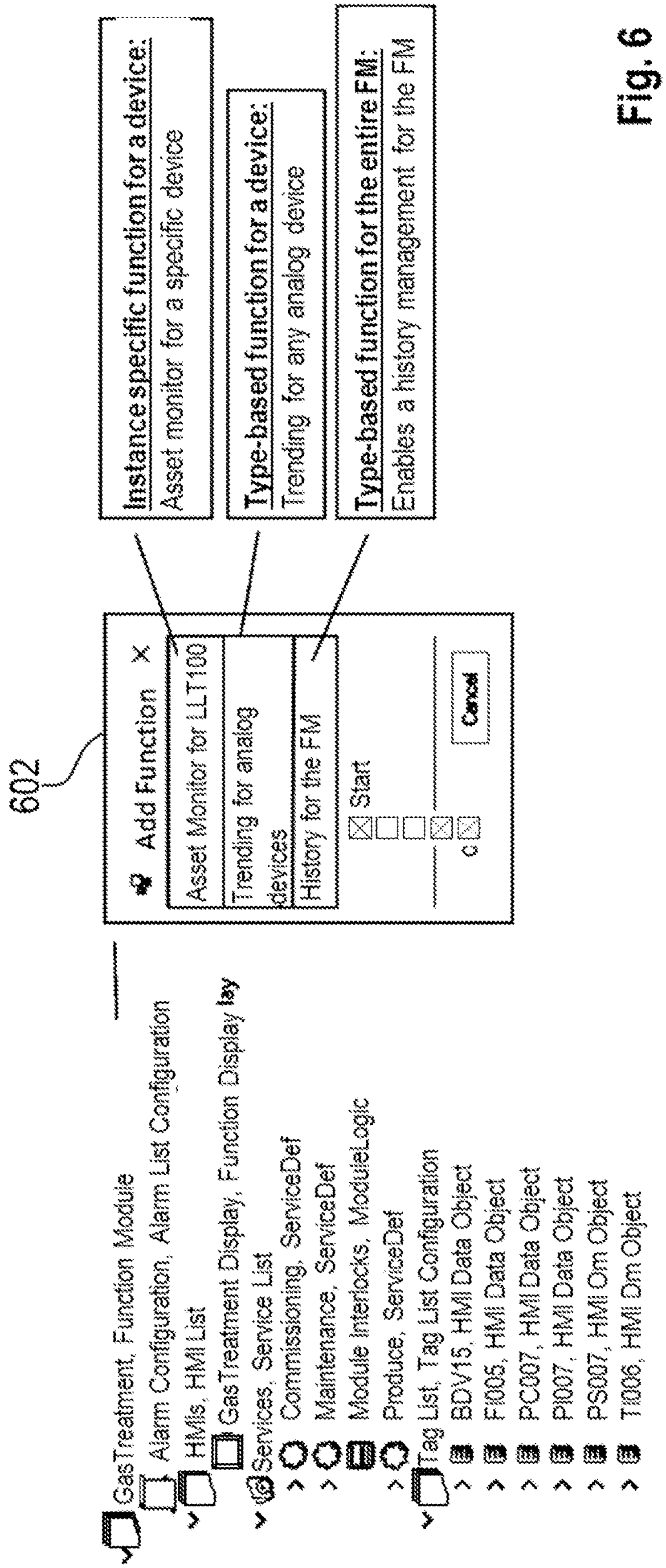
FIG. 6 is a diagram of Assignment/adding external functions in accordance with the disclosure.

Referring to FIG. 6, the assignment or adding of external functions 602 is described in the following. The external function can be developed in tools externally of the orchestration designer. When the function is available, or at least the interface is "implemented" in the function, it can be registered in orchestration designer. The orchestration designer can be used to filter the functions based on the used devices, services, and other functionality of the function module. When the user right-clicks on a tag 106, the FM or parts in the instance, the external functionality that relates to the corresponding can be added. FIG. 6 shows some examples of functions that belong to different parts of the FM. It shows an instance specific function for adding an asset monitor to a LLT100 device, another function for the tag, that uses the FM interface (type model) to add a trend to an analog monitoring device—which is independent of the actual device used—and a function to enable history and information management for the entire FM, also on type base.

Figure 7:
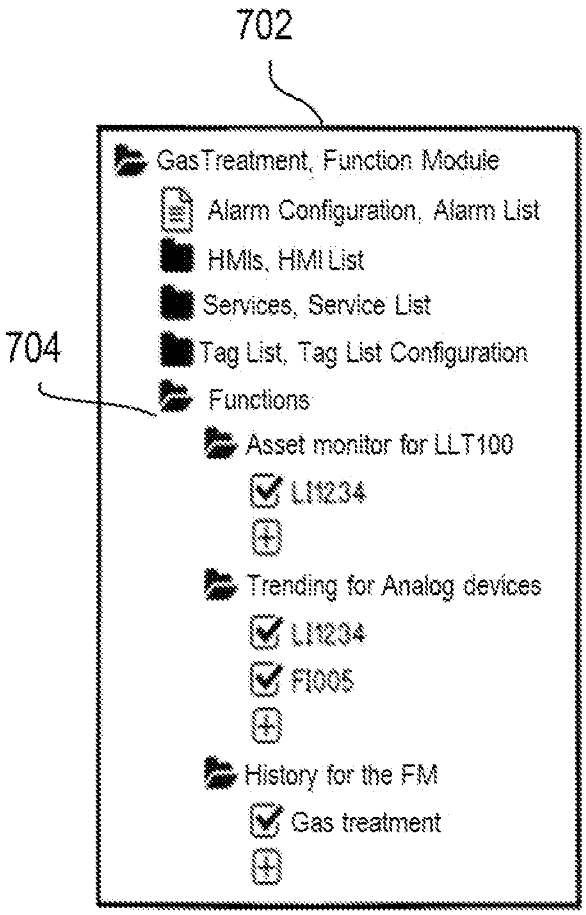
FIG. 7 is a Structure for overview of functions in accordance with the disclosure.

The functions could be added by right-click on the specific device in the tree 702. A pre-filtered list 704 could pop up only showing functions available for the selected device. In order to better overview the functions, a functions-list (sub-tree) 704 as shown in FIG. 7, could be added. This sub-tree could list/group the functions and list the devices/nodes to which they were applied underneath. By this, they can be easily removed from the devices as well new devices added. Devices may even be added in bulk, by a menu that allows the user to filer/sort the devices by certain filter criteria.

Technically, the function definitions can be stored in AAS registries as sub-models assigned to the specific asset id (e.g., FM type asset id) or some further categorization of modules (e.g., any measurement device). Information exchange between the FM and the AAS sub-models can be realized by HTTP-REST API calls on the resources of the AAS—sub-models elements, events or operations. Selection of needed API is orthogonal to the deployment of the component providing this API. Defining the deployment and the generation of the communication flow between the FM and external function provider is described in the next section.

The advanced or external function might not be executed on the same target system as the function module instance, i.e., the external function might not be deployed on the controller later but can run on another device in another hierarchy level, e.g., on an edge device or the cloud. Since the interface is standardized and the advanced/external function can expose which parameters of the FM it uses, the communication between the external function and the later FM instance can be deployed automatically. The assumption is that the external function provides information about its connectivity, e.g., an OPC UA endpoint. If this is the case, the communication between the function module instance and the external function can be automatically established. With the information from the interfaces, which devices and functions of a function module is used by which external function, a mapping between the communication interfaces of the FM and the communication interface of the external function can be automatically created. Thus, by simple generating the connection between the properties, belonging semantically together, of the communication interface of the FM instance and the external function, the communication can be created.

The FM instance does not need to know where the external function is finally deployed and how it is executed, the information given for the interface and the functions used from the function module is enough.

Figure 8:
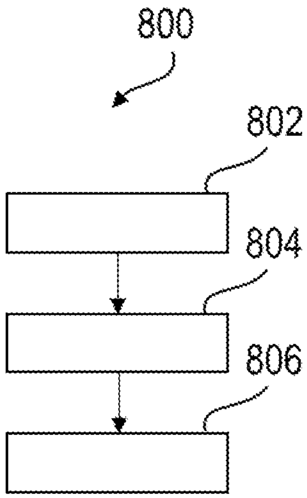
FIG. 8 is a flowchart for a method in accordance with the disclosure.

FIG. 8 shows a flow diagram of a method 800 for adding external functions to a function module and/or function module instance in an industrial process environment is provided. The method comprises the following steps:

creating 802 a connecting interface for the function module and/or function module instance, wherein the function module and/or function module instance comprises information according to which the industrial process is operated, creating 804 an external function module containing the external function using the definitions of the connecting interface, and adding 806 the external functions by importing the external functions from the external function module.

Figure 9:
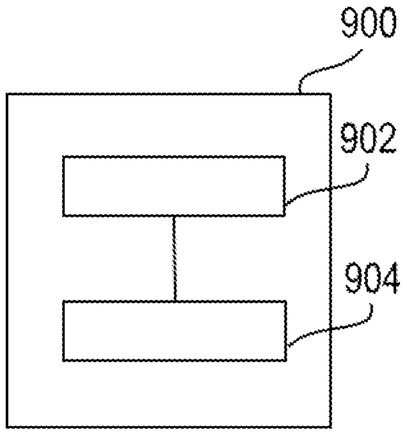
FIG. 9 is a block diagram with processing devices for the function module, function module interface, and external function module, in accordance with the disclosure.

FIG. 9 shows a block diagram with a processing device 902 within an industrial processing system 900 on which the method 800 is executed, and on which the function module 102 including its function module interface and function module instance 104 including function module instance interface is located. The external function module is located on a network device 904 remote from processing device 902.

Other variations to the disclosed embodiments can be understood and effected by those skilled in the art in practicing the claimed invention, from the study of the drawings, the disclosure, and the appended claims. In the claims, the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage.

In one general aspect, the function module instance provides additionally device specific information as described below.

The added external function module and its functions may remain outside the function module or function module instance. It may even be executed on a separated hardware or a remote hardware. Therefore, connectivity information may be required. This connectivity information of the external function may be performed by accessing an OPC UA node containing the desired information. The communication between a function module instance and the external function can then performed automatically. The communication comprises exchange of the interface information, accessing the functions of the external function, communication between the different views or functions of shared equipment and/or services, and/or the communication between devices.

According to an embodiment, the definitions according to which the industrial process is operated are a process topology, services, monitoring, devices and/or parameters of the industrial process.

In the function module, functionality is implemented that is applied when controlling and monitoring the process. The connecting interface provides the above-mentioned information about the functionalities to the outside.

According to an embodiment, the connecting interface comprises a function module interface and a function module instance interface.

The function module and the function module instance each have an interface. Consequently, the connecting interface comprises a function module interface and a function module instance interface. The differences between them are mentioned in the following.

According to an embodiment, the function module interface further comprises definitions of the function module type, services, service parameters, process topology and/or device tags.

Different function modules may be available or created in a plant containing different tags, topology, services etc. A type is a specific function module of these different function modules and has a name by which the module can be identified. A type defines, e.g., the topology of the FM, as well as the services. Examples for services are "produce", "maintenance", "commissioning", etc. Service parameters are, for example, max./min. temperature for pausing, resuming, holding, stopping, aborting. The process topology defines the connection of the devices, or "tags" as in the function modules only the device type are defined but not the actual devices. The actual devices are assigned to the device types of the FM in the function module instance.

According to an embodiment, the function module instance interface further comprises definitions of services, service parameter values and/or process topology, and further comprises device specific information.

Device specific information are, for example, device parameters, maintenance intervals, etc.

According to an embodiment, the function module interface further comprises attributes that can be used by the external function module to mark devices and services that are used by both, the function module and/or function module instance and the external function, i.e. shared devices and services.

Functions and devices that are used by external functions, as well, have to be known in the engineering that the engineer can see what is actually used from his function module and therefore can, for example, see, what his changes affect from the other system. Furthermore, the connection information is needed for later runtime generation. The connectivity between the external function and the FM, device or instance is automatically generated in the supervisory system.

According to an embodiment, the connecting interface is configured to obtain the definitions of services, service parameter values and/or process topology, device tags and further comprises device specific information needed by the external function from a data file interface and/or an Application Programming Interface (API).

The possibility to mix API-based and file-based information access may be based on the capabilities of involved "discipline tools", e.g., P&ID editors.

Summarized, the definitions or basic information required to connect the advanced/external functions to a function module may be:

a) The information of the tags, including the standardized attributes, e.g., according to VDI 2658.
b) The topology information, how the tags are connected to each other. This information can be included in a similar form like in the Module Type Package (MTP), VDI 2658 part 2.
c) Information about the provided services, the service hierarchy, including their parameters.
d) Attributes that allow marking used services and tags, as well as parts of the topology that are used.
e) Device and service instance specific information, such as limits, device type, etc.

The interface could be defined as Asset Administration Shell (AAS), or parts of the MTP and hereby contain all information needed by functions that are external to the function module or function module instance. All functions implementing the interface could be connected to a function module and make the function modules aware of the function and that this function is used in the FM or FM instance.

Furthermore, the proposed approach is not limited to listed standards a)-e) and can be further extended according to use-cases of specific projects, customers, industrial or regional segments. The aspect of extensibility is already accepted by the market with the analogy to the Aspect Object technology, basing on the standard ISO81346. In the engineering, these functions are added as AAS sub models and for the deployment, this information is used to automatically connect the different functions. That means for example for an asset monitor, which is used for an FM, the asset monitor might be deployed on an edge device, the FMs core control is generated in the same manner as today and the communication can be generated based on the interface delivered with the AAS for the integration.

According to a second aspect, a method for adding external functions to a function module and/or function module instance in an industrial process environment is provided. The method comprises the following steps. In a first step, a connecting interface for the function module and/or function module instance is created, wherein the function module and/or function module instance comprises information according to which the industrial process is operated. In a second step, an external function module containing the external function using the definitions of the connecting interface is created. In a third step, the external functions is added by importing the external functions from the external function module.

Before creating the connecting interface, the FM or FM instance may be created as a new type that can be considered as model. The FM or FM instance contains the topology information, services, tags, parameters etc. of a process and, e.g., their default attributes and default values.

According to an embodiment, the step creating a connecting interface for the function module and/or function module instance, wherein the function module and/or function module instance comprises information according to which the industrial process is operated comprises the following substeps: engineering the function module by defining a new type, service parameters and tags, and engineering the function module instance, where the tags are assigned to devices, service parameter values are engineered and parameters the actual implementation is obtained from the devices.

The type defines the topology of the FM, as well as the services.

According to an embodiment, before the step importing the external functions from the external function module, the step: generating a communication between the function module instance and the external function is performed.

According to an embodiment, before the step generating a communication between the function module instance and the external function, the step: accessing an OPC UA (Open Platform Communications United Architecture) node containing connectivity information of the external function is performed and wherein the generating a communication between the function module instance and the external function is performed automatically using the connectivity information.

According to an embodiment, the communication further comprises a communication between the different views or functions of shared devices and/or services, and/or the communication between devices.

According to a third aspect, a processing device for running a function module and/or function module instance for operating an industrial process comprising the function module with a connecting interface as described herein is provided.

The processing device may further comprise an external function module configured to use the connecting interface described herein. The processing device may be a processing and control device. The processing device may further comprises an external function module configured to use the connecting interface described herein.

According to a fourth aspect, an industrial process network comprising a processing device as described herein and a network device different from the processing and control device comprising an external function module configured to use the connecting interface described herein is provided.

In contrast to the FM and/or function module instance, the external function might not be deployed on the processing and control device, "controller" for short, later but can run on another device in another hierarchy level, e.g., on an edge device or the cloud.

According to a fifth aspect, a use of a connecting interface as described herein for adding external functions to the function module and/or function module instance is provided.

These and other features, aspects and advantages of the present invention will become better understood with reference to the accompanying figures and the following description.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

LIST OF REFERENCE NUMERALS

100 Connecting FM interface
102 Function Module (Type)/Function Module interface
104 Function Module Instance/Function Module Interface
106 Tags
107 Devices
108 Topology
110 Service Parameters
111 Service Parameter Values
112 Services
402 Parameterization
702 Tree
704 Pre-filtered functions-list
800 Method
802-806 Method steps
900 Industrial Processing System
902 Processing device
904 Network device

What is claimed is:

1. A connecting interface for a function module and/or function module instance in an industrial process environment for connecting an external function to the function module and/or function module instance, comprising:

a function module (type) interface and a function module instance interface;

definitions included in the function module and/or function module instance according to which the industrial process is operated, the function module (type) interface and the function module instance interface having different definitions; and information to create an external function module containing the external function by which the external functions can be added to the function module and/or function module instance contained in the connecting interface, wherein the function module (type) interface comprises attributes by which the external function module explicitly marks devices of services of the function module that the external function uses.

2. The connecting interface according to claim 1, wherein the definitions according to which the industrial process is operated are a process topology, services, monitoring, devices and/or parameters of the industrial process.

3. The connecting interface according to claim 1, wherein the function module (type) interface further comprises definitions of the function module type, services, service parameters, process topology and/or device tags.

4. The connecting interface according to claim 1, wherein the function module instance interface further comprises definitions of services, service parameter values and/or process topology, and further comprises device specific information.

5. The connecting interface according to claim 1, further comprising connectivity information of the external function sufficient to automatically generate communication between the function module instance and the external function using an OPC UA endpoint of the external function.

6. The connecting interface according to claim 1, wherein the connecting interface is configured to obtain the definitions of services, service parameter values and/or process topology, device tags and further comprises device specific information needed by the external function from a data file interface and/or an API.

7. A method for adding external functions to a function module and/or function module instance in an industrial process environment, comprising:

creating a connecting interface comprising a function module (type) interface and a function module instance interface, wherein the function module and/or the function module instance comprise definitions according to which the industrial process is operated, the function module (type) interface and the function module instance interface having different definitions;

creating an external function module containing the external function using information enabling the external functions to be added to the function module and/or function module instance contained in the connecting interface; and adding the external functions by importing the external functions from the external function module, wherein the function module (type) interface comprises attributes by which the external function module explicitly marks devices of services of the function module that the external function uses.

8. The method according to claim 7, wherein creating a connecting interface includes:

engineering the function module by defining a new type, service parameters and tags;

engineering the function module instance such that the tags are assigned to devices, service parameter values are engineered and parameters of the actual implementation is obtained from the devices.

9. The method according to claim 8, wherein, before the step of importing the external functions from the external function module is performed, generating a communication between a function module instance and an external function.

10. The method according to claim 9, wherein, before generating a communication between the function module instance and the external function is performed, accessing an OPC UA node containing connectivity information of the external function.

11. The method of claim 10, wherein generating a communication between the function module instance and the external function is performed automatically using the connectivity information.

12. The method according to claim 9, wherein the communication further comprises a communication between the different views or functions of shared devices and/or services, and/or the communication between devices.

* * * * *